UNITED STATES PATENT OFFICE.

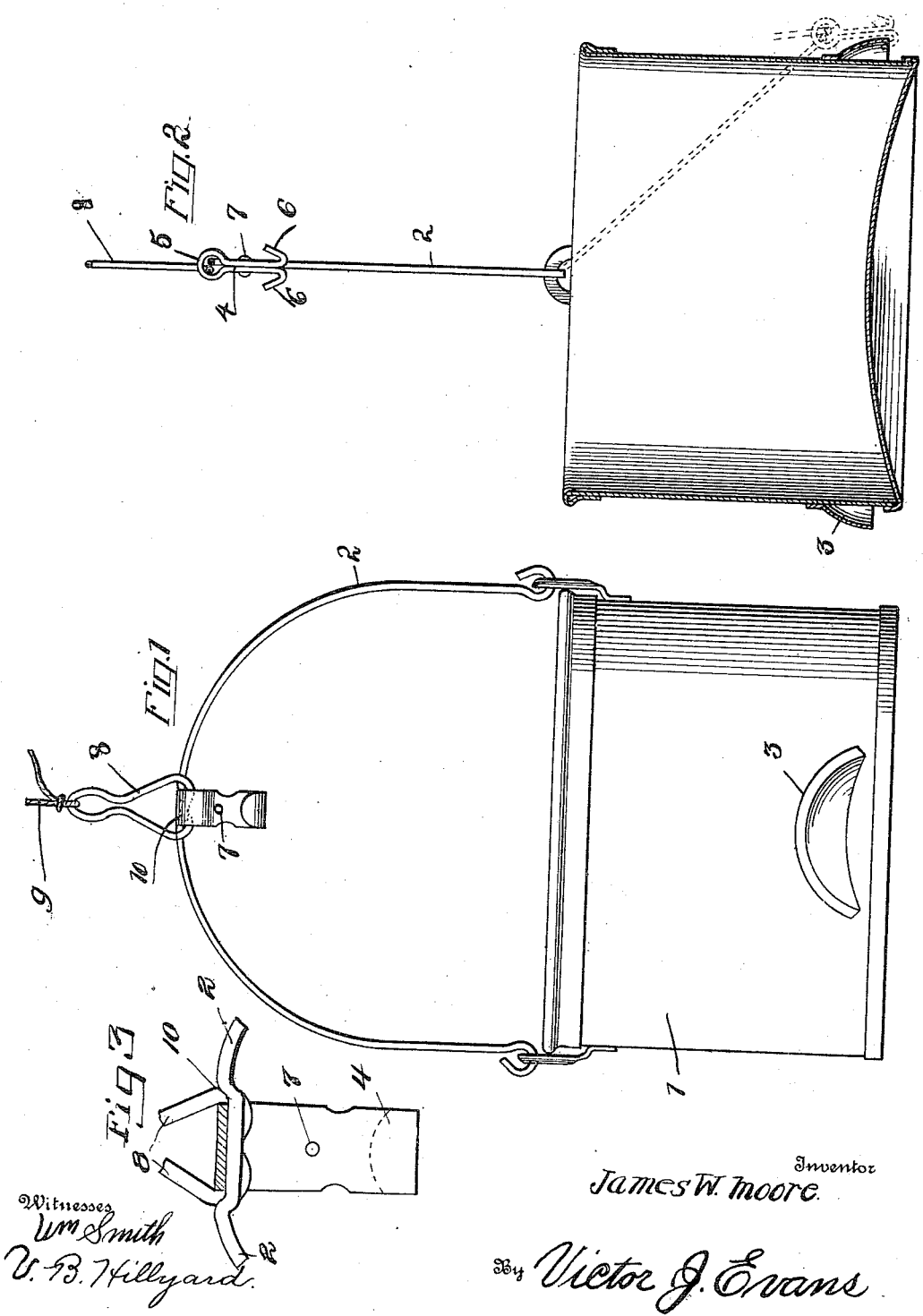
J. W. MOORE.
SELF DUMPING FRUIT BUCKET.
APPLICATION FILED JULY 2, 1909.
994,771.
Patented June 13, 1911.

JAMES W. MOORE, OF ST. JOSEPH, MISSOURI.

SELF-DUMPING FRUIT-BUCKET.

994,771. Specification of Letters Patent. Patented June 13, 1911.

Application filed July 2, 1909. Serial No. 505,645.

*To all whom it may concern:*

Be it known that I, JAMES W. MOORE, a citizen of the United States, residing at St. Joseph, in the county of Buchanan and State of Missouri, have invented new and useful Improvements in Self-Dumping Fruit-Buckets, of which the following is a specification.

This invention is designed to lessen the labor of persons engaged in picking fruit and to avoid the necessity of climbing up and down a tree a number of times to empty the bucket or other receptacle in which the picked fruit may be placed or of requiring the services of an attendant upon the ground to empty the receptacle when lowered from the tree.

This invention provides a bucket or receptacle which when filled may be lowered from the tree and automatically dumped, the fruit being discharged either into a barrel or basket or delivered upon the ground as may be required.

The invention contemplates combining with the bail and the body of a bucket or like receptacle coöperating means whereby when the bucket is lowered to the ground the upper portion of the bail engages with the lower portion of the bucket or receptacle so that upon pulling upward upon the string or cord the bucket is overturned and automatically discharges its contents.

The invention consists of the novel features, details of construction and combinations of parts which hereinafter will be more particularly set forth, illustrated in the accompanying drawings and pointed out in the appended claim.

Referring to the drawings forming a part of the specification: Figure 1 is a front view of a bucket embodying the invention. Fig. 2 is a central transverse section of the bucket, the dotted lines showing the bail lowered and engaged with the lower portion of the body of the bucket at one side thereof. Fig. 3 is a detail view of a portion of the bail and suspending loop together with the hook, the latter being in section.

Corresponding and like parts are referred to in the following description and indicated in all the views of the drawings by the same reference characters.

The body of the bucket or receptacle is designated by the reference numeral 1 and is provided with a bail 2 having its ends loosely connected to ears at opposite sides of the bucket or attached thereto in any manner to admit of the bail swinging to one side or the other of the bucket as indicated by the dotted lines in Fig. 2. Cleats 3 are provided at opposite sides of the bucket near the bottom thereof and are hollow and consist of pieces of sheet metal pressed outward and secured to the sides of the bucket or receptacle in any substantial way. The bottom of the bucket is slightly raised as indicated in Fig. 2 so as to prevent slipping of the bucket when overturned or tilted to discharge the contents thereof.

A hook 4 is mounted upon the bail 2 and is provided at its upper end with an eye 5 and at its lower end with an inclined bill 6. The hook is doubled to admit of its engaging with the cleat 3 at either side of the bucket according to whichever direction the bail may drop when the bucket is lowered. The hook is preferably formed of a strip or blank which is doubled upon itself, the eye 5 being formed at the fold and the end portions being brought together and secured by means of a rivet or fastening 7 and the terminal portions being upwardly and outwardly bent to provide the bills 6. A suspending loop 8 is adapted to engage the eye 5 of the hook and the operating cord or rope 9 is attached to the suspending loop in any manner. In order that the hook may retain a central position upon the bail it is preferred to depress the latter as indicated at 10, said depression forming a seat in which the eye portion of the hook is fitted thereby preventing the hook from sliding laterally upon the bail when the operating cord or rope 9 is slackened to admit of the folding of the bail after the bucket or receptacle has been lowered to the ground to effect a discharge of the contents thereof.

In accordance with this invention, the person after climbing a tree to strip the same of its fruit may fill the bucket or receptacle and lower the same to the ground and discharge the bucket and again draw the same upward to be again filled. This operation may be continued until the tree is stripped without necessitating the person to climb down the tree or requiring the services of an assistant upon the ground to empty the bucket when lowered. After the bucket has been filled it is lowered upon the ground or into a basket, barrel or the like, and when the bucket reaches a resting place the operating rod or cord 9 is slackened thereby permitting the bail to fold upon one side or the other of the bucket according to the inclination of the drop. When the bail reaches its lowest position, the hook will swing inward and engage the cleat 3 upon the side against which the bail folds. An upward pull upon the cord or rope 9 will cause the bucket to overturn and discharge the contents thereof. After the bucket has been discharged it is drawn upward and the hook disengaged from the cleat and the operation repeated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claim appended hereto.

Having thus described the invention, what is claimed is—

In combination, a bucket, cleats upon opposite sides of the bucket near the bottom thereof, a bail pivotally connected to the upper portion of the bucket and adapted to fold against opposite sides to bring its top portion within a short distance of the bottom of the bucket, said bail having its medial portion depressed, a double hook mounted upon the depressed portion of the bail and consisting of a strip folded about the bail and having its end portions brought together and secured and the terminal portions oppositely bent to form hooks which are adapted to engage the cleats of the bucket when the bail is folded, a suspending loop engaging the folded portion of the strip forming the double hook, and an operating cord attached to the suspending loop.

In testimony whereof I affix my signature in presence of two witnesses.

JAMES W. MOORE.

Witnesses:
BLANCHE L. LEE,
PHOEBE J. LEE.

---

Copies of this patent may be obtained for five cents each, by addressing the "Commissioner of Patents, Washington, D. C."